US012360480B2

(12) United States Patent
Koseki

(10) Patent No.: US 12,360,480 B2
(45) Date of Patent: Jul. 15, 2025

(54) IMAGE FORMING APPARATUS WITH CLEANING, COLLECTION, AND DISCHARGE OF TONER

(71) Applicant: CANON KABUSHIKI KAISHA, Tokyo (JP)

(72) Inventor: Hiromichi Koseki, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/212,475

(22) Filed: Jun. 21, 2023

(65) Prior Publication Data

US 2023/0418184 A1 Dec. 28, 2023

(30) Foreign Application Priority Data

Jun. 24, 2022 (JP) ................................ 2022-102274

(51) Int. Cl.
*G03G 15/095* (2006.01)
*G03G 15/00* (2006.01)
(Continued)

(52) U.S. Cl.
CPC ......... *G03G 15/095* (2013.01); *G03G 15/502* (2013.01); *G03G 21/105* (2013.01); (Continued)

(58) Field of Classification Search
CPC ................. G03G 15/095; G03G 21/12; G03G 2215/1647; G03G 15/161; G03G 21/0005;
(Continued)

(56) References Cited

U.S. PATENT DOCUMENTS 6,226,490 B1 5/2001 Fujita et al.
6,889,027 B2 5/2005 Tachiki et al.
(Continued)

FOREIGN PATENT DOCUMENTS

JP 4-42285 A 2/1992
JP 2001-209243 A 8/2001
(Continued)

OTHER PUBLICATIONS

Partial European Search Report dated Nov. 27, 2023, in European Patent Application No. 23176006.7.
(Continued)

*Primary Examiner* — Stephanie E Bloss
*Assistant Examiner* — Laura Roth
(74) *Attorney, Agent, or Firm* — Venable LLP

(57) ABSTRACT

An image forming apparatus includes an image bearing member, a cleaning device detachably provided on a main assembly to clean toner remaining on the image bearing member, a main assembly feeding portion detachably provided on the main assembly to feed the toner discharged from the cleaning device, a collecting container detachably provided on the main assembly to collect the toner discharged from the main assembly feeding portion, a control portion, and an operating portion capable of inputting a predetermined instruction to the operating portion. Without an image forming operation based on the predetermined instruction, the control portion performs a discharging operation in which the main assembly feeding portion is caused to be driven to discharge the toner inside of the main assembly feeding portion.

8 Claims, 10 Drawing Sheets

(51) Int. Cl.
*G03G 21/10* (2006.01)
*G03G 21/12* (2006.01)

(52) U.S. Cl.
CPC ..... *G03G 21/12* (2013.01); *G03G 2215/1647* (2013.01); *G03G 2221/1624* (2013.01); *G03G 2221/1627* (2013.01)

(58) Field of Classification Search
CPC .... G03G 21/105; G03G 15/502; G03G 21/10; G03G 2221/1624; G03G 2221/1627
See application file for complete search history.

(56) References Cited

U.S. PATENT DOCUMENTS

| | | | |
|---|---|---|---|
| 8,131,165 B2 | 3/2012 | Yamaguchi et al. | |
| 9,261,850 B2 | 2/2016 | Koseki | |
| 9,448,510 B2 | 9/2016 | Izumi et al. | |
| 9,632,457 B2 | 4/2017 | Koseki et al. | |
| 2003/0156864 A1* | 8/2003 | Tachiki | G03G 15/161 399/303 |
| 2007/0230976 A1* | 10/2007 | Takahashi | G03G 15/0862 399/72 |
| 2012/0014722 A1 | 1/2012 | Okino et al. | |

FOREIGN PATENT DOCUMENTS

| | | | |
|---|---|---|---|
| JP | 2003-241469 | A | 8/2003 |
| JP | 2005-301221 | A | 10/2005 |
| JP | 2008-158005 | A | 7/2008 |
| JP | 2010-152022 | A | 7/2010 |
| JP | 2016-014812 | A | 1/2016 |
| JP | 2016-033537 | A | 3/2016 |
| JP | 2020-079836 | A | 5/2020 |
| KR | 10-2010-0036157 | A | 4/2010 |

OTHER PUBLICATIONS

Extended European Search Report dated Mar. 22, 2024, in European Application No. 23176006.7.

* cited by examiner

IMAGE FORMING APPARATUS WITH CLEANING, COLLECTION, AND DISCHARGE OF TONER

FIELD OF THE INVENTION AND RELATED ART

The present invention relates to image forming apparatuses such as copiers, printers and facsimile devices using an electrographic method or an electrostatic recording method, or multifunction printers provided with a plurality of these functions.

Conventionally, for example, image forming apparatuses such as electrographic multifunction printers are occasionally collected as used products from a market and remanufactured for reuse (reused, recycled). Also, in order to decrease the cost of remanufactured image forming apparatus products, a configuration that suppresses exterior damage, etc., during collection (waste distribution, reverse logistics), such as reducing the burden of collecting and remanufacturing used products and reducing replacement parts, has been proposed.

For example, a configuration including a storage portion that accommodates fixed members and connecting members used only during distribution inside of a main assembly, a configuration including an accommodation portion that accommodates connecting members which connect peripheral devices during distribution, and a configuration that secures a distance between devices during bare distribution at the time of collection have been proposed (Japanese Laid-Open Patent Application (JP-A) 2005-301221).

In recent years, from the perspective of protecting the environment and the effective utilization of resources, there has also been an increasing demand to remanufacture image forming apparatuses for reuse. In terms of remanufacturing image forming apparatuses for reuse, used products are collected from users, and procedures such as cleaning and remanufacturing are performed on the entire product, its units and parts. The products are then reshipped to the market as remanufactured products, along with a guarantee of quality.

During this process, toner remaining in a used image forming apparatus product may occasionally be dispersed inside of the used product due to vibration during transportation when the used product is collected (waste distribution). Then, the state of the used product may no longer be appropriate for remanufacturing for reuse, or, even if the used product can be remanufactured for reuse, cleaning may be problematic.

In contrast, it is thought that the toner can be virtually entirely discharged from a toner feeding portion by extending a driving time of toner feeding mechanisms in the toner feeding portion, such as a collecting feeding portion, which feeds the collected toner to a collecting container during a normal operation of the image forming apparatus.

However, parts of the toner feeding portion in remanufactured products are often recycled. Further, a driving of the toner feeding mechanisms in the toner feeding portion is often interconnected with the driving of a functional member, such as a photosensitive drum or an intermediary transfer belt. For this reason, extending the driving time of the toner feeding mechanisms during normal operation may cause a decrease in a lifetime of toner feeding portion parts when considering remanufacture for reuse, or a decrease in the lifetime of the aforementioned functional members during normal operation, or when considering remanufacture for reuse.

SUMMARY OF THE INVENTION

Therefore, the purpose of the present invention is to suppress the dispersal of the toner inside of the used image forming apparatus products during the collection of the used products.

The aforementioned purpose can be attained in the image forming apparatus pertaining to the present invention. In summary, according to an aspect of the present invention, there is provided an image forming apparatus comprising: an image bearing member; a cleaning device detachably provided on a main assembly and configured to clean toner remaining on the image bearing member; a main assembly feeding portion detachably provided on the main assembly and configured to feed the toner discharged from the cleaning device; a collecting container detachably provided on the main assembly and configured to collect the toner discharged from the main assembly feeding portion; a control portion configured to control the main assembly feeding portion; and an operating portion capable of inputting a predetermined instruction to the operating portion, wherein without an image forming operation based on the predetermined instruction, the control portion performs a discharging operation in which the main assembly feeding portion is caused to be driven to discharge the toner inside of the main assembly feeding portion.

Further features of the present invention will become apparent from the following description of the exemplary embodiment with reference to the attached drawings.

DESCRIPTION OF THE EMBODIMENT

In the following, an embodiment of an image forming apparatus pertaining to the present invention will be specifically described with reference to Figures.

Embodiment 1

1. Overall Configuration and Operation of the Image Forming Apparatus

Figure 1:
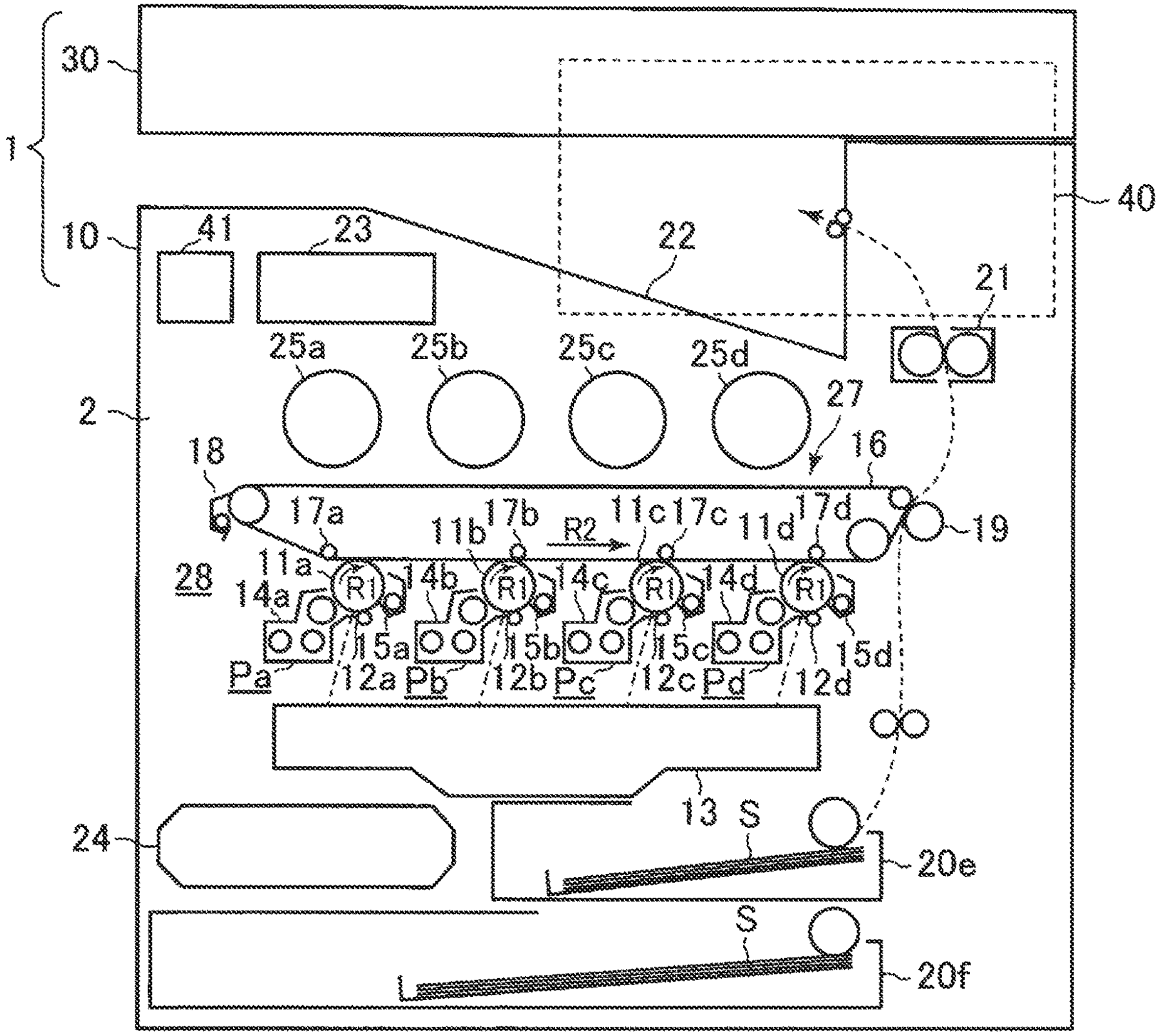
FIG. 1 is a cross-sectional schematic view of an image forming apparatus.

FIG. 1 is a cross-sectional schematic view of an image forming apparatus 1 of the present embodiment. An image forming apparatus 1 of the present embodiment is a tandemtype multifunction printer (including copying, printing and facsimile functions) which employs an intermediary transfer method and which can form full-color images by using an electrographic method.

Incidentally, concerning the image forming apparatus 1 and its elements, a near side of a sheet in FIG. 1 will be referred to as a "front (traverse)" side, while a rear side of the sheet will be referred to as a "back (rear)" side. A front-back direction, which connects these front and back sides, shall be approximately parallel to a rotational axis direction of photosensitive drums 11 described below. Further, regarding the image forming apparatus 1 and its elements, a vertical direction refers to above and below a gravitational direction (perpendicular direction); however, this does not only refer to right above or right below and includes an upper side and a lower side of a horizontal plane passing through each highlighted element or through its position.

The image forming apparatus 1 includes a printer portion 10 and an image scanner 30. The printer portion 10 is provided with process units Pa, Pb, Pc and Pd for yellow, magenta, cyan and black as described below, an exposure device 13, an intermediary transfer unit 27, a secondary transfer roller 19, a fixing device 21, etc. For elements corresponding to each color which are included for the same function or configuration, the letters a, b, c and d suffixed to the reference numeral signifying which color the element is for may be omitted and described generally for all colors. The process units P are comprised to include the photosensitive drums 11, charging devices 12 disposed around the photosensitive drums 11, developing devices 14 and drum cleaning devices 15, which are described below.

Figure 6:
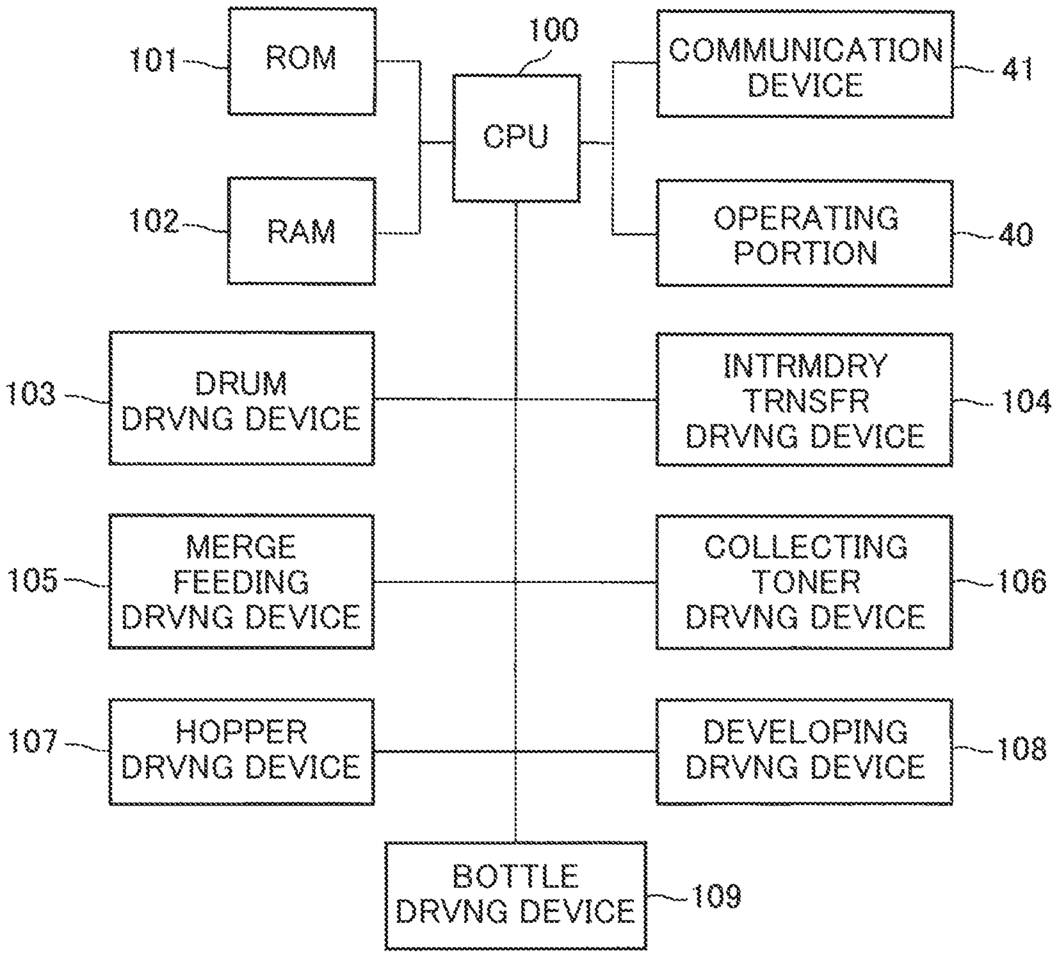
FIG. 6 is a schematic block view indicating a control configuration of the image forming apparatus.

The photosensitive drums 11, which are drum-type (cylindrical) photoreceptors (electrographic photoreceptors) as image bearing members, are rotation-driven at a predetermined peripheral velocity in a direction of an arrow R1 (in a clock-wise direction) in FIG. 1 by a drum driving device 103 (FIG. 6). The surface of the rotating photosensitive drums 11 is uniformly charge-processed to a predetermined electric potential of a predetermined polarity (a negative polarity in the present embodiment) by the charging devices 12 as charging means. During charge-processing, a predetermined charge voltage (charge bias) is applied to the charging devices 12. The charge-processed surface of the photosensitive drums 11 is scan-exposed by the exposure device (laser beam scanner) 13 as an exposure means based on image data to be recorded, and an electrostatic latent image (electrostatic image) is formed on the photosensitive drums 11. In the present embodiment, the exposure device 13 is comprised as one unit that can expose the photosensitive drum 11 for each color based on image data for each color component, and is disposed below the photosensitive drum 11 for each color. The exposure device 13 forms an electrostatic image on the photosensitive drums 11 by projecting a laser beam which has been altered based on image data to be recorded on the photosensitive drums 11. The electrostatic image formed on the photosensitive drums 11 is developed (visualized) by toner being provided to the developing devices 14 as developing means, and a toner image (toner figure, developer image) is formed on the photosensitive drums 11. In the present embodiment, the developing devices 14 use a two-component developer provided with toner (non-magnetic toner particles) as a developer and carrier (magnetic carrier particles), and form a toner image by adhering the toner to the electrostatic image on the photosensitive drums 11. The developing device 14 for each color is replenished (supplied) with the toner (in the present embodiment, replenishment developer provided with toner and carrier) from a toner bottle 25 for each color. In the present embodiment, the toner bottle 25 for each color is disposed above the intermediary transfer unit 27. During development, a predetermined developing voltage (developing bias) is applied to a developing sleeve as a developer bearing member (developing member) provided by the developing devices 14. In the present embodiment, the toner that has been charged to the same polarity (a negative polarity in the present embodiment) as a charging polarity of the photosensitive drums 11 adheres to an exposure portion (image portion) on the photosensitive drums 11, whose absolute value has decreased due to exposure after being uniformly charge-processed (reversal development method). In the present embodiment, a normal charging polarity of the toner, which is the main charging polarity of the toner during development, is a negative polarity.

An intermediary transfer belt 16, which is comprised of an endless belt as an intermediary transfer member, is disposed so that it opposes the photosensitive drum 11 for each color. In the present embodiment, the intermediary transfer belt 16 is disposed above the photosensitive drum 11 for each color. The intermediary transfer belt 16 is stretched by being stretched across a plurality of stretching rollers which apply a predetermined tension to the intermediary transfer belt 16. The intermediary transfer belt 16 rotates (orbits) at a predetermined peripheral velocity in a direction of an arrow R2 (in a counter-clockwise direction) in FIG. 1 by the rotational drive of a driving roller, which is one of a plurality of stretching rollers, by an intermediary transfer driving device 104 (FIG. 6). On an inner circumferential surface side of the intermediary transfer belt 16, primary transfer rollers 17, which are roller-type primary transfer members as primary transfer means, are each disposed in a position corresponding to the photosensitive drum 11 for each color. The primary transfer rollers 17 press the intermediary transfer belt 16 toward the photosensitive drums 11, and form primary transfer portions (primary transfer positions) where the photosensitive drums 11 contact the intermediary transfer belt 16. When the toner image formed on the photosensitive drums 11 is fed to the primary transfer portions by the rotation of the photosensitive drums 11, the toner image is transferred (primary transferred) to the rotating intermediary transfer belt 16 by the action of the primary transfer rollers 17. During the primary transfer, a predetermined primary transfer voltage (primary transfer bias), which is the opposite polarity (positive polarity in the present embodiment) of the normal charging polarity of the toner, is applied to the primary transfer rollers 17. For example, during formation of a full-color image, toner images for yellow, magenta, cyan and black, which are formed on the photosensitive drum 11 for each color, are sequentially transferred to the intermediary transfer belt 16 so that the toner images are superposed on the intermediary transfer belt 16.

On an outer circumferential surface side of the intermediary transfer belt 16, the secondary transfer roller 19, which is a roller-type secondary transfer member as a secondary transfer means, is disposed in a position with the intermediary transfer belt 16 interposed therebetween and opposite to a secondary transfer opposing roller, which is one of a plurality of stretching rollers. The secondary transfer roller 19 is pressed toward the aforementioned secondary transfer opposing roller via the intermediary transfer belt 16, and forms a secondary transfer portion (secondary transfer position) where the intermediary transfer belt 16 contacts the secondary transfer roller 19. When the toner image formed on the intermediary transfer belt 16 is fed to the secondary transfer portion by the rotation of the intermediary transfer belt 16, the toner image is then transferred (secondary transferred) on a recording material S by the action of the secondary transfer roller 19, which is nipped and fed between the intermediary transfer belt 16 and the secondary transfer roller 19. During the secondary transfer, a predetermined secondary transfer voltage (secondary transfer bias), which is the opposite polarity (a positive polarity in the present embodiment) of the normal charging polarity of the toner, is applied to the secondary transfer roller 19. The timing of the recording material (transfer material, recording medium or sheet) S is matched with that of the toner image on the intermediary transfer belt 16 by feeding devices 20*e*, 20*f*, etc., and the recording material S is fed to the secondary transfer portion.

The recording material S, which has passed through the secondary transfer portion and to which the toner image has been transferred, is fed to the fixing device 21 as a fixing means, which is disposed on the downstream side of the secondary transfer portion in the feeding direction of the recording material S. The fixing device 21 fixes (melts, adheres) the toner image on the recording material S by heating and pressing the recording material S which bears the unfixed toner image. The recording material S, whose toner image has been fix-processed, is discharged (outputted) to a discharge tray 22, which is provided on the outside of a main assembly 2 of the image forming apparatus 1.

On the other hand, the toner remaining on the photosensitive drums 11, which was not transferred to the intermediary transfer belt 16 (primary transfer residual toner) during the primary transfer, is removed and collected from the photosensitive drums 11 by the drum cleaning devices 15 as photoreceptor cleaning means. The toner collected by the drum cleaning devices 15 is discharged from the drum cleaning devices 15 and fed to a collected toner box 24, as described below. Further, a belt cleaning device 18 as an intermediary transfer cleaning means is disposed around the intermediary transfer belt 16. The toner remaining on the intermediary transfer belt 16 (secondary transfer residual toner), which was not transferred to the recording material S during the secondary transfer, is removed and collected from the intermediary transfer belt 16 by the belt cleaning device 18. The toner collected by the belt cleaning device 18 is discharged from the belt cleaning device 18 and fed to the collected toner box 24, as described below. In the present embodiment, the collected toner box 24 is disposed below the exposure device 13.

Incidentally, in the present embodiment, the process units P for each color (process cartridges), which are provided with the photosensitive drums 11, the charging devices 12, the developing devices 14 and the drum cleaning devices 15, are each integrally detachable from the main assembly 2. However, at least one of the photosensitive drums 11, the charging devices 12, the developing devices 14 or the drum cleaning devices 15 can be separately detachable from the main assembly 2 either independently or along with other elements. For example, a drum unit, which is provided with the photosensitive drums 11, the charging devices 12 and the drum cleaning devices 15, and the developing devices (developing units) 14, can be separately detachable from the main assembly 2.

Further, in the present embodiment, the intermediary transfer unit 27 is comprised of the intermediary transfer belt 16, a plurality of stretching rollers, each of the primary transfer rollers 17, the belt cleaning device 18, etc., and a frame [etc.] supporting these elements. The intermediary transfer unit 27 is integrally detachable from the main assembly 2.

Further, in the present embodiment, the toner bottle 25 for each color as a replenishing container is detachable from the main assembly 2.

Further, in the present embodiment, the collected toner box 24 as a collecting container is detachable from the main assembly 2.

Further, the image forming apparatus 1 is provided with an operating portion (operating panel) 40. In the present embodiment, the operating portion 40 is provided on the front side of the main assembly 2. The operating portion 40 includes a display portion, such as a liquid crystal display, and an input portion, such as keys. The display portion is used to display information to operators, such as users and service representatives, by controlling a controller 23 provided on the image forming apparatus 1. The input portion is used to input data such as various setting information and start instructions of various operations (signals), etc., to the controller 23 through operations by an operator. The operating portion 40 can be comprised to include a touch panel which is provided with a combined function of the display portion and the input portion. Operators can use the operating portion 40 to select which function of the image forming apparatus 1 they will use.

For example, if an operator selects a copy function, the operator can use the operating portion 40 to configure a number of copies, magnification/reduction, darkness, one-sided/double-sided, color/black and white, a cassette which feeds the recording material S, a size of the recording material S, staples, etc. Further, in a case in which the operator selects the copy function, the operator pushes the start button on the operating portion 40 with the original copy, which will be the copy source, on the image scanner 30 as an image reading portion. By doing so, the image is read by the image scanner 30, and the loaded data is sent to the controller 23 in the image forming apparatus 1. That data is then converted to an image formation signal by the controller 23, and an image forming process is performed by the aforementioned printer portion 10. Or, data is sent from an external device such as a personal computer (not shown in the Figure) to the controller 23 via a communication device 41 in the image forming apparatus 1 and is then converted to the image formation signal for the aforementioned copying operation, and the image forming process is performed by the aforementioned printer portion 10.

Incidentally, in the present embodiment, an image forming portion 28, which performs an image forming operation that forms an image on the recording material S by using the developer based on image data, is comprised of each process unit P, the exposure device 13, the intermediary transfer unit 27, the secondary transfer roller 19, the fixing device 21, etc.

2. Toner Feeding Paths

Next, toner feeding paths in the image forming apparatus 1 of the present embodiment will be described. Incidentally, in the present embodiment, in addition to the toner, carrier, etc., may be fed in the toner feeding paths described below. Here, in addition to the toner, carrier, toner additives and other items to be fed or collected may simply be referred to as "toner". All such items can be generally referred to as "developer".

Figure 2:
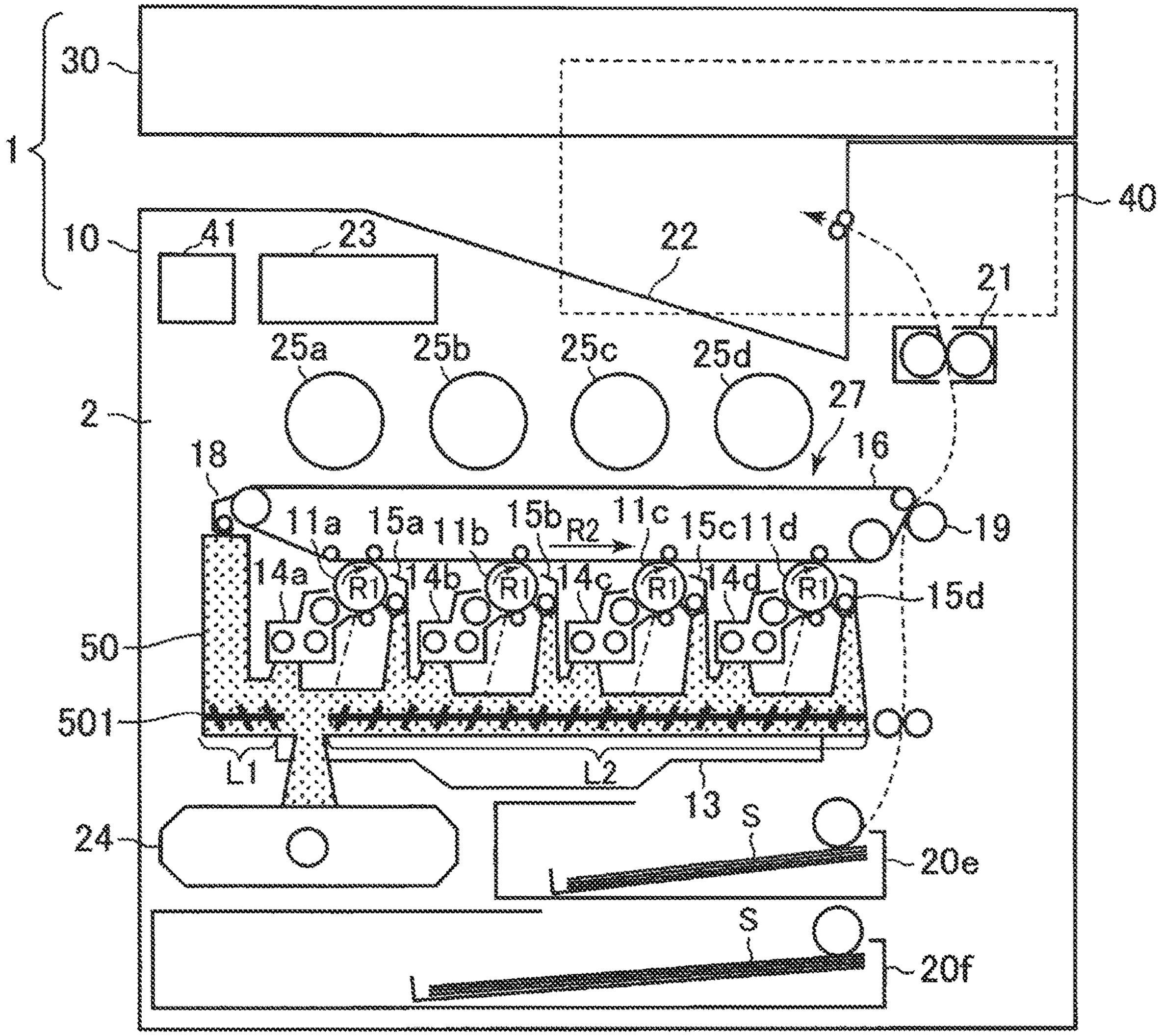
FIG. 2 is a cross-sectional schematic view of the image forming apparatus indicating a merging feeding portion.

FIG. 2 is a cross-sectional schematic view of the image forming apparatus 1 of the present embodiment with a merging feeding portion 50 superposed on FIG. 1. In the present embodiment, the drum cleaning device 15 for each color, the developing device 14 for each color and the belt cleaning device 18 are connected to the collected toner box 24 by the merging feeding portion 50 (a main assembly feeding portion 50), which is a toner feeding portion configured on the side of the main assembly 2. In the present embodiment, the drum cleaning device 15 for each color, the developing device 14 for each color and the belt cleaning device 18 are directly connected to one merging feeding portion 50. Further, in the present embodiment, this one merging feeding portion 50 is directly connected to one collected toner box 24. However, the present invention is not limited to such a configuration. For example, at least one of the following can be provided on the upstream side of the merging feeding portion 50: the drum cleaning device 15 for each color, the developing device 14 for each color, or the belt cleaning device 18 which is connected to a separate toner feeding portion.

Further, the configuration can be such that the toner is collected in two or more collected toner boxes 24. For example, the configuration can be as such that the toner from the drum cleaning device 15 for each color and the developing device 14 for each color, and the toner from the belt cleaning device 18 are each fed to an independent collected toner box 24. Further, in the present embodiment, in order to collect the carrier and toner discharged from the developing devices 14 as described below, the developing devices 14 are connected to the collected toner box 24 via the merging feeding portion 50. However, the present invention is not limited to such a configuration, and can be such that the carrier and toner are not discharged from the developing devices 14, and the developing devices 14 are not connected to the collected toner box 24.

Figure 3:
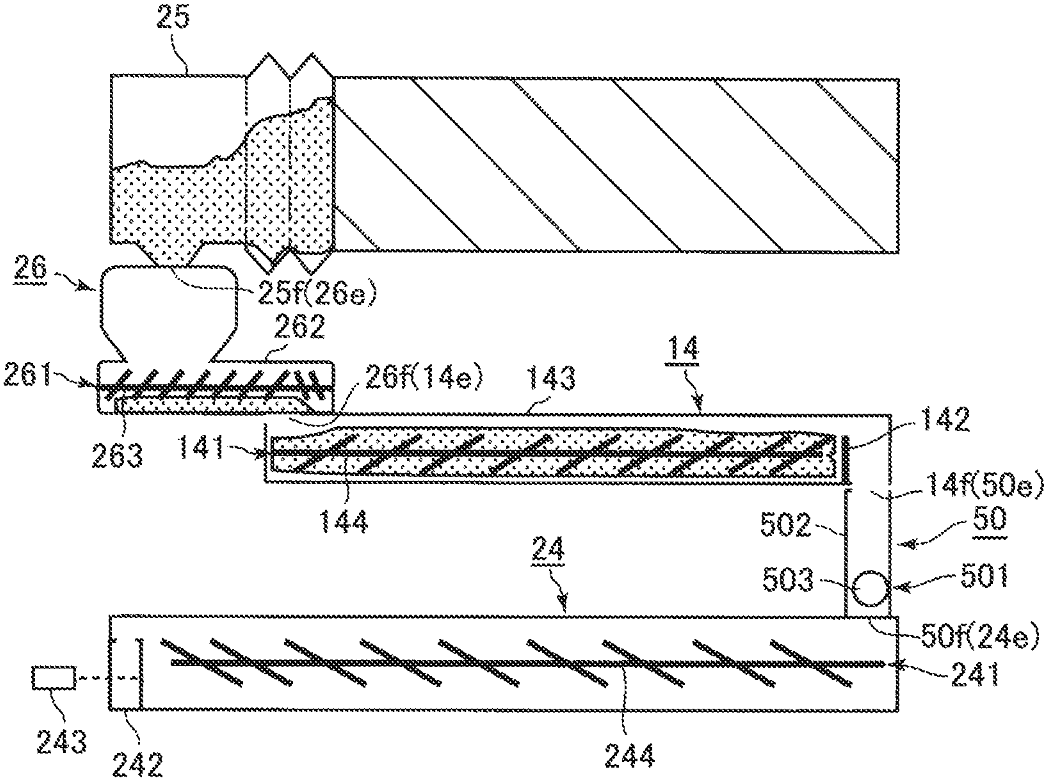
FIG. 3 is a schematic cross-sectional side view indicating a toner feeding path from a toner bottle to a collected toner box.

FIG. 3 is a schematic cross-sectional side view as seen from a left side of FIG. 1, indicating a toner feeding path from the toner bottles 25 to the collected toner box 24. Incidentally, only a configuration for one process unit P is shown in FIG. 3 to represent all the process units P; however, the configuration is virtually the same for the process unit P for each color. The toner bottles 25 are connected to the developing devices 14 so that the toner (in the present embodiment, the replenishment developer which is provided with toner and carrier) is feedable to the developing devices 14 via a hopper 26. The deteriorated carrier and toner are discharged from the developing devices 14 by an automatic carrier refresh mechanism described below. For this reason, the developing devices 14 are connected to the collected toner box 24 so that the carrier and toner are feedable to the collected toner box 24 via the merging feeding portion 50.

The toner bottles 25 are driven by a bottle driving device 109 (FIG. 6), feed the toner (the replenishment developer) inside of the toner bottles 25, then discharge the toner (the replenishment developer) from the toner bottles 25 toward the hopper 26. When the toner bottles 25 are mounted on the main assembly 2, they are connected to the bottle driving device 109 provided on the main assembly 2 and become drivable. The toner bottles 25 are driven as appropriate according to the consumption of the toner (the replenishment developer) inside of the hopper 26, and replenish the toner (the replenishment developer) to the hopper 26.

The toner (the replenishment developer) discharged from the toner bottles 25 is supplied to the developing devices 14 via the hopper 26. The hopper 26 is fixed to the main assembly 2. The hopper 26 includes a hopper container 262 and a hopper feeding mechanism 261 as a toner feeding mechanism which feeds the replenishment developer inside of the hopper container 262. The hopper feeding mechanism 261 comprises a hopper feeding member 263, such as a screw, and a hopper driving device 107 (FIG. 7), which drives the hopper feeding member 263. Along with feeding the toner (the replenishment developer) inside of the hopper container 262 by the hopper feeding mechanism 261, the hopper 26 levels a supply amount of the toner (the replenishment developer) per unit time to the developing devices 14.

The developing devices 14 include a developing container 143, and a developing feeding mechanism 141 as a toner feeding mechanism which feeds the toner (two-component developer provided with toner and carrier) inside of the developing container 143. The developing feeding mechanism 141 comprises a developing feeding member 144, such as a screw, provided on the developing devices 14, and a developing driving device 108 (FIG. 6) provided on the main assembly 2, which drives the developing feeding member 144. Incidentally, in the present embodiment, in the developing devices 14, in addition to the developing feeding mechanism 141, the developing sleeve as a developer bearing member (developing member) which bears the developer and feeds it to the opposing portion of the photosensitive drums 11, is also driven by a driving force transmitted from the developing driving device 108. When the developing devices 14 (process units P) are mounted on the main assembly 2, the developing feeding member 144 is connected to the developing driving device 108 and becomes drivable. Along with feeding the toner and carrier accommodated inside of the developing container 143 by the developing feeding mechanism 141, the developing devices 14 stir the toner and carrier accommodated inside of the developing container 143 and tribo-charge (charge up) the toner. The carrier which is not displaced to the photosensitive drums 11 during development deteriorates due to repeated use. For this reason, in the present embodiment, the image forming apparatus 1 employs the following automatic carrier refresh mechanism (also referred to as "ACR" below). In other words, ACR is a mechanism which, along with supplying new carrier with the toner from the toner bottles 25, maintains the deterioration of the carrier inside of the developing devices 14 to be substantially constant by discharging a fixed amount of deteriorated carrier inside of the developing container 143. The amount of the carrier discharged from the developing container 143 by ACR is regulated by an ACR wall 142 provided on the developing container 143. Incidentally, a small amount of the toner is normally discharged along with the carrier. The carrier and toner discharged from the developing devices 14 by transcending the ACR wall 142 merge in the merging feeding portion 50 with the toner collected from the photosensitive drums 11 and the intermediary transfer belt 16 by the drum cleaning devices 15 and the belt cleaning device 18. These carriers and toners are then fed to the collected toner box 24 via the merging feeding portion 50.

The merging feeding portion 50 includes a merging feeding path 502, and a merging feeding mechanism 501 as a toner feeding mechanism which feeds the toner and carrier from inside of the merging feeding path 502. The merging feeding portion 50 is fixed to the main assembly 2. The merging feeding mechanism 501 comprises a merging feeding member 503, such as a screw, and a merging feeding driving device 105 (FIG. 6), which drives the merging feeding member 503. The merging feeding portion 50 feeds the toner and carrier inside of the merging feeding path 502 by the merging feeding mechanism 501, and discharges the toner and carrier from the merging feeding portion 50 toward the collected toner box 24.

The toner and carrier discharged from the merging feeding portion 50 are accommodated inside of the collected toner box 24. A collected toner leveling member 244, such as a screw, comprising a collected toner leveling mechanism 241 as a toner feeding mechanism, is provided on the collected toner box 24. The collected toner leveling mechanism 241 comprises the collected toner leveling member 244 provided on the collected toner box 24, and a collected toner driving device 106 (FIG. 6), which drives the collected toner leveling member 244 and is provided on the main assembly 2. When the collected toner box 24 is mounted on the main assembly 2, the collected toner leveling member 244 is connected to the collected toner driving device 106 and becomes drivable. The collected toner leveling mechanism 241 feeds the toner inside of the collected toner box 24 and levels the toner powder inside of the collected toner box 24. Further, a detecting mechanism 243 as a detecting means (a detecting portion), which detects the toner inside of the collected toner box 24, is provided on the main assembly 2. The toner and carrier that have been fed to the collected toner box 24 are filled toward the back of the collected toner box 24 by the collected toner leveling mechanism 241. When toner inside of the collected toner box 24 becomes nearly full, the configuration is such that the toner enters inside a detecting accommodating portion 242, which is provided at the very back of the collected toner box 24 and is formed with a transparent member that transmits light. Then, the fact that the toner has entered inside the detecting accommodating portion 242 is detected by the optical detection type detecting mechanism 243. A signal indicating that the detecting mechanism 243 23 has detected the toner is inputted to the controller 23 by the detecting mechanism 243. Based on this signal, the controller 23 then performs a process to notify the operator that the collected toner box 24 is full on the operating portion 40 (or on an external device) after a fixed amount of image formation after the detecting mechanism 243 has detected the toner.

Further, the controller 23 prohibits the performance of image forming operations until the collected toner box 24 has been replaced and the signal indicating the detection of the toner by the detecting mechanism 243 is turned OFF.

Figure 4:
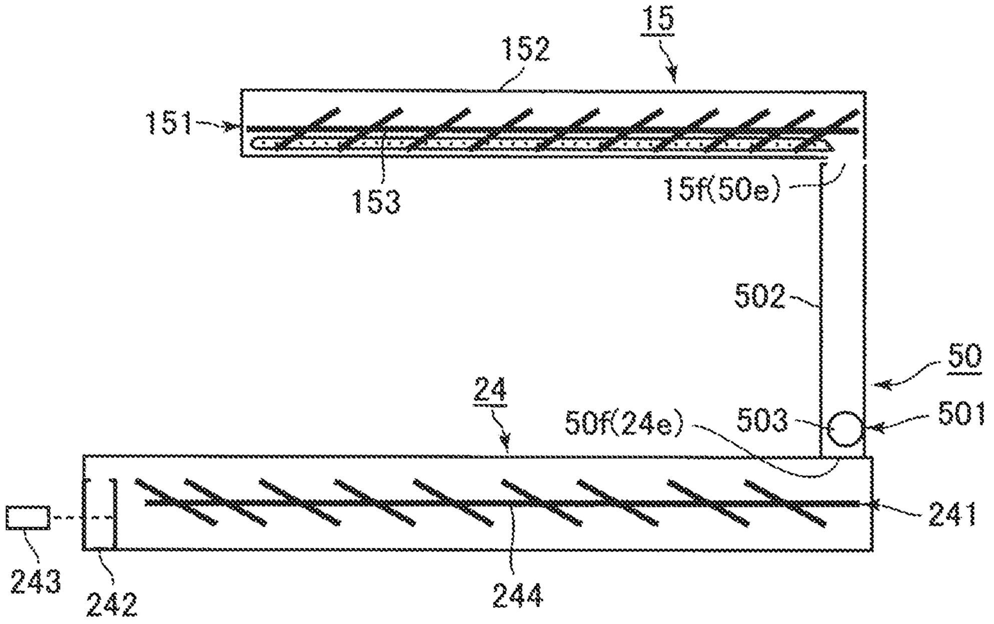
FIG. 4 is a schematic cross-sectional side view indicating a toner feeding path from a drum cleaning device to the collected toner box.

FIG. 4 is a schematic cross-sectional side view as seen from the left side of FIG. 1, indicating a toner feeding path from the drum cleaning devices 15 to the collected toner box 24. Incidentally, only a configuration for one process unit P is shown in FIG. 4 to represent all the process units P; however, the configuration is virtually the same for the process unit P for each color. The drum cleaning devices 15 each include a drum cleaning container 152, and a drum cleaning feeding mechanism 151 as a toner feeding mechanism, which feeds the toner inside of the drum cleaning container 152 (the toner collected from the photosensitive drums 11). The drum cleaning feeding mechanism 151 comprises a drum cleaning feeding member 153, such as a screw, provided on the drum cleaning devices 15, and the drum driving device 103 (FIG. 6), which drives the drum cleaning feeding member 153 and is provided on the main assembly 2. The drum driving device 103 is a common driving device which drives the photosensitive drums 11 and the drum cleaning feeding mechanism 151. In the present embodiment, the drum driving device 103 is driven in interrelation with the photosensitive drums 11 and the drum cleaning feeding mechanism 151. When the drum cleaning devices 15 (the process units P) are mounted on the main assembly 2, the drum cleaning feeding member 153 is connected to the drum driving device 103 and becomes drivable. The drum cleaning devices 15 feed the toner inside of the drum cleaning container 152 by the drum cleaning feeding mechanism 151 and discharge the toner from the drum cleaning devices 15 toward the merging feeding portion 50. In the merging feeding portion 50, the toner discharged from the drum cleaning devices 15 merges with the carrier and toner discharged from the developing devices 14, and with the toner discharged from the belt cleaning device 18. These carriers and toners are then fed to the collected toner box 24 via the merging feeding portion 50, as described above.

Figure 5:
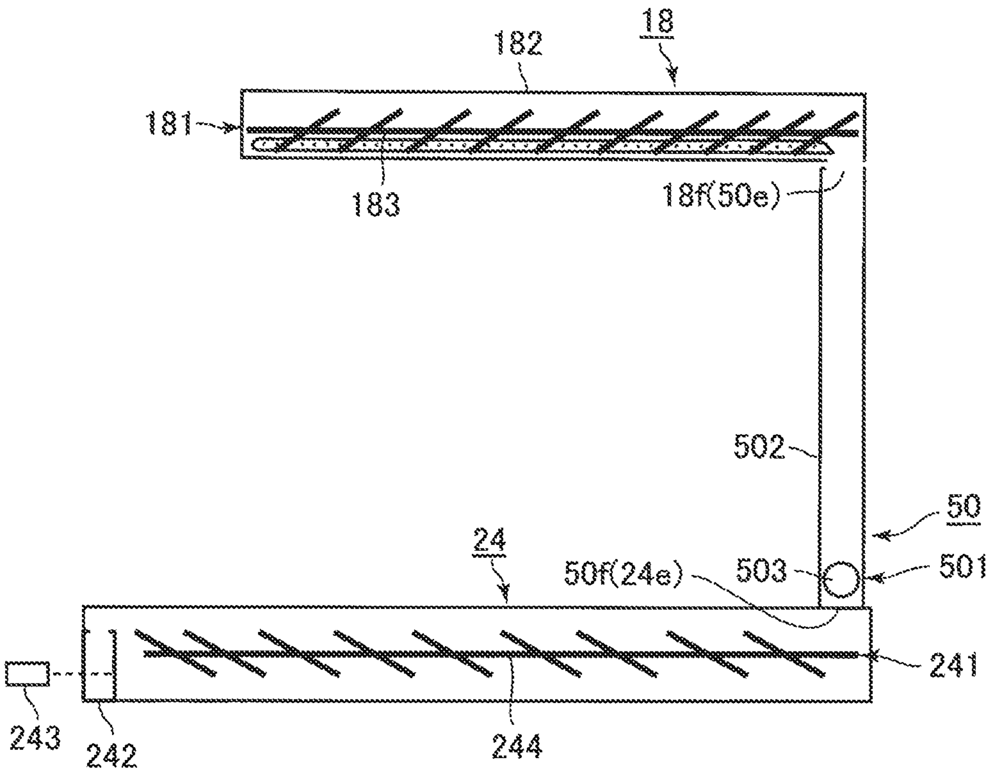
FIG. 5 is a schematic cross-sectional side view indicating a toner feeding path from a belt cleaning device to the collected toner box.

FIG. 5 is a schematic cross-sectional side view as seen from the left side of FIG. 1, indicating a toner feeding path from the belt cleaning device 18 to the collected toner box 24. The belt cleaning device 18 includes a belt cleaning container 182, and a belt cleaning feeding mechanism 181 as a toner feeding mechanism, which feeds the toner inside of the belt cleaning container 182 (the toner collected from the intermediary transfer belt 16). The belt cleaning feeding mechanism 181 comprises a belt cleaning feeding member 183, such as a screw, provided on the belt cleaning device 18, and the intermediary transfer driving device 104 (FIG. 6), which drives the belt cleaning feeding member 183 and is provided on the main assembly 2. The intermediary transfer driving device 104 is a common driving device which drives the intermediary transfer belt 16 and the belt cleaning feeding mechanism 181. In the present embodiment, the intermediary transfer driving device 104 is driven in interrelation with the intermediary transfer belt 16 and the belt cleaning feeding mechanism 181.

When the belt cleaning device 18 (the intermediary transfer unit 27) is mounted on the main assembly 2, the belt cleaning feeding member 183 is connected to the intermediary transfer driving device 104 and becomes drivable. The belt cleaning device 18 feeds the toner inside of the belt cleaning container 182 by the belt cleaning feeding mechanism 181, and discharges the toner from the belt cleaning device 18 toward the merging feeding portion 50. In the merging feeding portion 50, the toner discharged from the belt cleaning device 18 merges with the carrier and toner discharged from the developing devices 14, and with the toner discharged from the drum cleaning devices 15. These carriers and toners are then fed to the collected toner box 24 via the merging feeding portion 50, as described above.

The toner bottles 25 and the hopper 26 are connected to a discharge port **25*f* provided on the toner bottles 25, and to a receiving port 26*e* provided on the hopper 26, and become communicable so as to allow the delivery of the toner. Further, the hopper 26 and the developing devices 14 are connected to a discharge port 26*f* provided on the hopper 26, and to a receiving port 14*e* provided on the developing devices 14, and become communicable so as to allow the delivery of the toner. Further, the developing devices 14 and the merging feeding portion 50 are connected to a discharge port 14*f* provided on the developing devices 14, and to a receiving port 50*e* provided on the merging feeding portion 50, and become communicable so as to allow the delivery of the toner. Further, the drum cleaning devices 15 and the merging feeding portion 50 are connected to a discharge port 15*f* provided on the drum cleaning devices 15, and to the receiving port 50*e* provided on the merging feeding portion 50**, and become communicable so as to allow the delivery of the toner.

Further, the belt cleaning device 18 and the merging feeding portion 50 are connected to a discharge port **18*f* provided on the belt cleaning device 18, and to the receiving port 50*e* provided on the merging feeding portion 50, and become communicable so as to allow the delivery of the toner. Further, the merging feeding portion 50 and the collected toner box 24 are connected to a discharge port 50***f* provided on the merging feeding portion 50, and to a receiving port 24*e* provided on the collected toner box 24, and become communicable so as to allow the delivery of the toner. In the present embodiment, the feeding of the toner through a connecting portion between each of the aforementioned discharge ports and receiving ports is achieved by descent due to gravity. Further, a shutter which shields an opening portion when the connection is released can be provided on at least one of the connecting portions between the aforementioned discharge ports and receiving ports. The hopper 26, the developing devices 14, the drum cleaning devices 15, the belt cleaning device 18, and the merging feeding portion 50 each comprise the toner feeding portion.

3. Toner Discharge Mode

As mentioned above, in remanufacturing image forming apparatuses for reuse, the toner remaining in a used product may occasionally be dispersed inside of the apparatus due to vibration during transportation when the used product is collected (waste distribution). The state of the used product may then no longer be appropriate for remanufacturing for reuse, or, even if the used product can be remanufactured for reuse, cleaning may be problematic.

In response to this, during normal operation of the image forming apparatus, it is thought that the toner can virtually be completely discharged from the toner feeding portion by extending the driving time of the toner feeding mechanisms in the toner feeding portions such as the collecting feeding portion, which feeds collected toner to the collecting container. For example, a method in which the toner feeding mechanisms are only driven for a duration sufficient to discharge the toner from the toner feeding portion when a print job is being completed can be given as an example. Incidentally, "a print job" means a series of operations outputted from the image forming apparatus 1 that form an image with the toner on a single or a plurality of recording materials S based on image data, which are started by a start instruction.

However, toner feeding portion parts in remanufactured products are often recycled. Further, the toner feeding mechanisms in the toner feeding portion are often driven in interrelation with functional members, such as the photosensitive drums and the intermediary transfer belt. For this reason, extending the driving time of the toner feeding mechanisms during normal operation may cause a decrease in a lifetime of the toner feeding portion parts when considering remanufacture for reuse, or a decrease in the lifetime of the aforementioned functional members during normal operation or when considering remanufacture for reuse. In particular, for machines for offices with a small number of images formed per print job, a proportion of operations that discharge the toner from the toner feeding portion (hereinafter referred to as "cleaning operations") which consume the lifetime may increase compared to the image forming operation. For this reason, in general, the driving time of the toner feeding mechanisms when completing a print job is configured to be a minimum amount of time so that the toner does not leak from the toner feeding portion, or so that the toner does not get clogged in the toner feeding portion.

Accordingly, in the present embodiment, the image forming apparatus 1 is capable of performing a toner discharge mode (toner discharge sequence), which operates the toner feeding portion, in particular, the toner feeding mechanism of the merging feeding portion 50 configured on the side of the main assembly 2, at an arbitrary timing without an accompanying image forming operation. Incidentally, in the present embodiment, without an accompanying image forming operation means without an accompanying start instruction for a print job inputted to the image forming apparatus 1, more specifically, without the formation of a toner image which is transferred to the recording material S on the photosensitive drums 11 and outputted. However, the configuration can be such that, at least one element which is driven when an image forming operation is performed, such as an element accompanying the performance of the toner discharge mode which is driven in interrelation, is driven when the toner discharge mode is performed. For example, in the present embodiment, the photosensitive drums 11 and the intermediary transfer belt 16 are driven in interrelation during the performance of the toner discharge mode. At this time, various voltages, such as the charging voltage, the developing voltage, the primary transfer voltage, and the secondary transfer voltage, can be applied.

The merging feeding portion 50 is the toner feeding portion (the collecting feeding portion) which collects the toner inside of the image forming apparatus 1 at the end and discharges it toward the collected toner box 24, and cannot be removed from the main assembly 2. For this reason, the merging feeding portion 50 can be said to be the portion with the most significant impact on the toner dispersal during the collection of used products of the image forming apparatus 1. According to the present embodiment, by allowing the aforementioned toner discharge mode to be performable, the toner dispersal inside of the apparatus due to vibration during transportation can be suppressed when collecting used products of the image forming apparatus 1. Further, according to the present embodiment, the depletion of the lifetime of the toner feeding portion parts and the lifetime of the functional members, such as the photosensitive drums 11 and the intermediary transfer belt 16, caused by the cleaning operations can be minimized. These will be explained in further detail below.

As mentioned above, performing the cleaning operations in interrelation with normal print jobs leads to the depletion of the lifetime of the toner feeding portion parts and the lifetime of the functional members, such as the photosensitive drums 11 and the intermediary transfer belt 16. For this reason, it is desirable that the toner discharge mode be performable at an arbitrary timing without an accompanying image forming operation. The following means are given as examples of triggers for the toner discharge mode.

Figure 9:
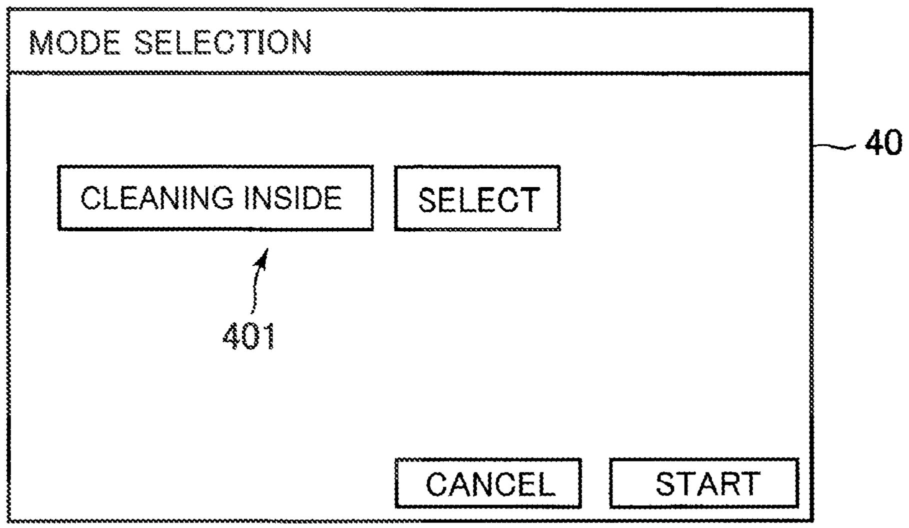
FIG. 9 is a schematic view explaining an example of a means by which the toner discharge mode is triggered.

First, there is a method to input a trigger signal for the toner discharge mode from the operating portion 40 to the controller 23 in response to an operation by an operator, such as a user or a service representative, on the operating portion 40 of the image forming apparatus 1. For example, as shown in FIG. 9, by having the operator operate a soft switch 401 (in the example in the Figure, an "in-apparatus cleaning during feeding" button, etc.) on the operating portion 40 (for example, a touch panel), the trigger signal for the toner discharge mode can be sent from the operating portion 40 to the controller 23. This method, for example, is effective in a case in which the image forming apparatus 1 is being used on a closed network at a user site, or in a case in which the image forming apparatus 1 is being used until the last minute on the day of the collection of the image forming apparatus 1. The operator, such as the service representative, can send the trigger signal for the toner discharge mode from the operating portion 40 to the controller 23 after visiting the user site to collect the image forming apparatus 1. Incidentally, switching the main power supply of the image forming apparatus 1 to OFF can be configured to be a trigger for performing the toner discharge mode.

Further, there is a method where the trigger signal for the toner discharge mode can be inputted from an external device to the controller 23 via the communication device 41 on the image forming apparatus 1. For example, this method is effective in a case in which the user has a maintenance contract for an image forming apparatus 1 connected to a network. The operator, such as the service representative, can send the trigger signal for the toner discharge mode in advance to the controller 23 from an external device, such as a computer at a service site, via the communication device 41. Incidentally, the trigger signal for the toner discharge mode can be inputted to the image forming apparatus 1 at the user site from an external device, such as a personal computer at the user site.

For either of the methods described above, it is assumed that operations, such as checking the usage history (counter) and backup activity to migrate user configuration data from the image forming apparatus 1 being collected to the image forming apparatus 1 being installed, will be executed in parallel to the performance of the toner discharge mode. For this reason, it can be said that the collection activity of the image forming apparatus 1 will not be hindered by the performance of the toner discharge mode.

FIG. 6 is a schematic block view describing a driving control configuration of the toner discharge mode in the present embodiment. The image forming apparatus 1 includes a CPU (central arithmetic device) 100 as a control portion. The CPU 100 is connected by a bus to a ROM 101 and a RAM 102 as memory means. The CPU 100 performs image forming operations and the toner discharge mode, etc., by performing various programs stored in the ROM 101. Further, when image forming operations and the toner discharge mode are performed, various control data used by the CPU 100 are saved in the RAM 102. In the present embodiment, the CPU 100, the ROM 101 and the RAM 102 are provided on the aforementioned controller 23.

When the CPU 100 receives the trigger signal for the toner discharge mode from an external device via the operating portion 40 or the communication device 41, the CPU 100 performs various load controls of the printer portion 10 and starts the toner discharge mode. When the CPU 100 starts the toner discharge mode, the CPU 100 starts the driving of the following driving devices, the drum driving device 103, which operates the photosensitive drum 11 and the drum cleaning device 15 (the drum cleaning feeding mechanism 151) for each color, the intermediary transfer driving device 104, which operates the intermediary transfer belt 16 and the belt cleaning device 18 (the belt cleaning feeding mechanism 181), the merging feeding driving device 105, which operates the merging feeding portion 50 (the merging feeding mechanism 501), the collected toner driving device 106, which operates the collected toner box 24 (the collected toner leveling mechanism 241), the hopper driving device 107, which operates the hopper 26 (the hopper feeding mechanism 261), and the developing driving device 108, which operates the developing devices 14 (the developing feeding mechanism 141). In other words, when the CPU 100 starts the toner discharge mode, the CPU 100 starts the operation of each of the following toner feeding mechanisms: the drum cleaning feeding mechanism 151, which is driven by the various driving devices mentioned above, the belt cleaning feeding mechanism 181, the merging feeding mechanism 501, the collected toner leveling mechanism 241, the hopper feeding mechanism 261, and the developing feeding mechanism 141. Incidentally, if the toner bottles 25 are operated in the toner discharge mode, the toner will be supplied again. For this reason, when the toner discharge mode is started, a stop signal is continually sent from the CPU 100 to the bottle driving device 109.

Here, the feeding of the toner accompanies the drum driving device 103, the intermediary transfer driving device 104, the merging feeding driving device 105, the collected toner driving device 106, the hopper driving device 107, and the developing driving device 108. Therefore, if the toner feeding mechanisms on the upstream side of the toner feeding paths connected in series operate one-sidedly, they will cause malfunctions such as toner leakage and clogging. For this reason, it is desirable to start the driving of the toner feeding mechanisms one by one from the toner feeding mechanisms on the downstream side of the toner feeding paths which are connected in series, or to start the driving of these toner feeding mechanisms substantially simultaneously. Incidentally, substantially simultaneously includes a margin of error for transmission errors in signals and driving systems (typically less than 1 second) (the same applies hereinafter).

On the other hand, in order to minimize the depletion of the lifetime of the toner feeding portion parts and the lifetime of the functional members, such as the photosensitive drums 11 and the intermediary transfer belt 16, it is desirable to minimize the driving time of the toner feeding mechanisms. Further, in order to suppress the toner dispersal (toner pollution) during collection, it is desirable that the toner feeding mechanisms are only driven for a duration sufficient for the toner which was inside of the toner accommodating portion on the upstream side to arrive at the toner accommodating portion on the downstream side. Accordingly, in the present embodiment, the configuration is such that, from the state in which all of the aforementioned toner feeding mechanisms (the drum cleaning feeding mechanism 151, the belt cleaning feeding mechanism 181, the merging feeding mechanism 501, the collected toner leveling mechanism 241, the hopper feeding mechanism 261, and the developing feeding mechanism 141) are operating, the toner feeding mechanisms are stopped one by one from the toner feeding mechanisms on the upstream side of the toner feeding paths which are connected in series, after confirming that each toner feeding mechanism has been driven for a sufficient duration.

Figure 7A:
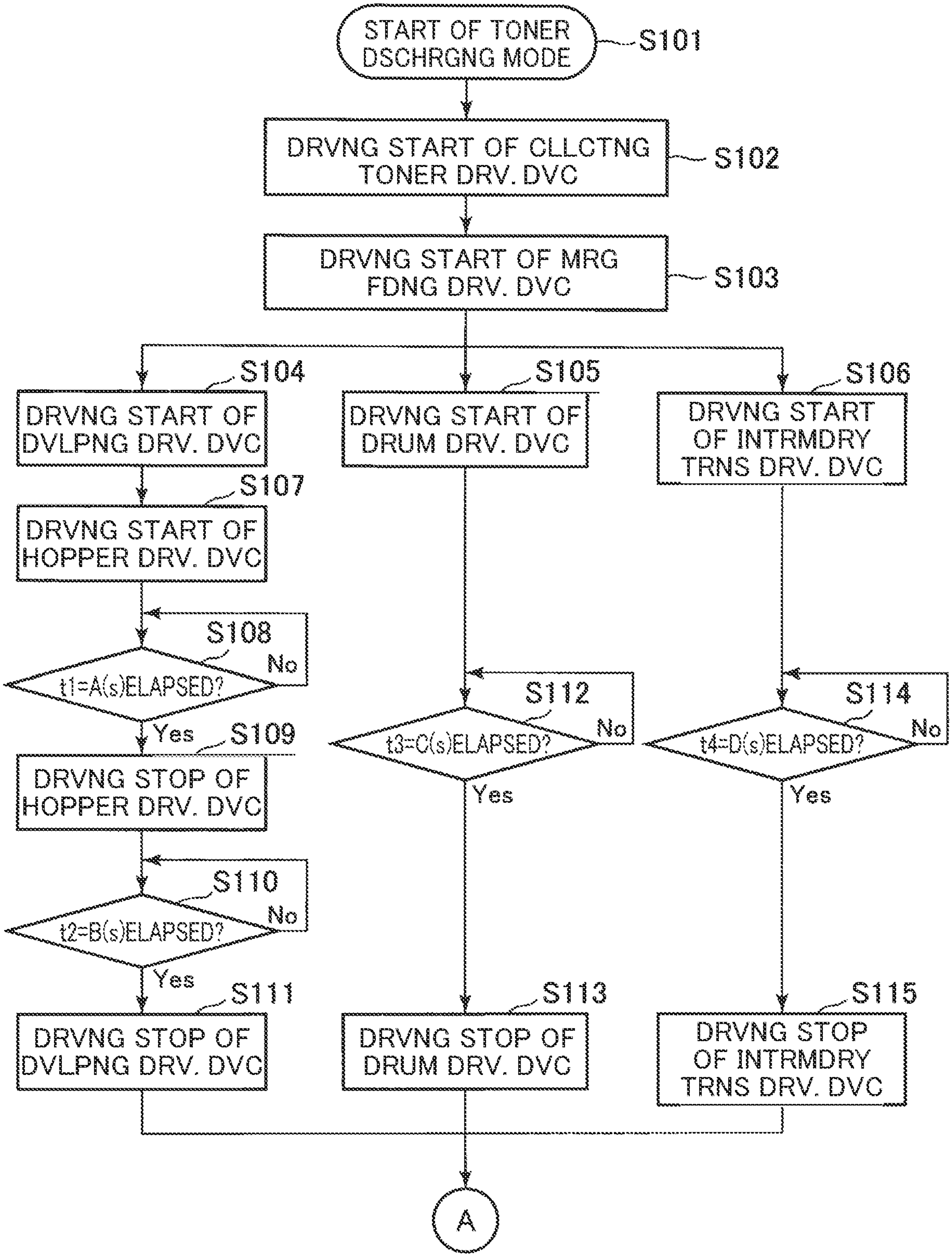
FIG. 7A is a flow chart of a toner discharge mode.
Figure 7B:
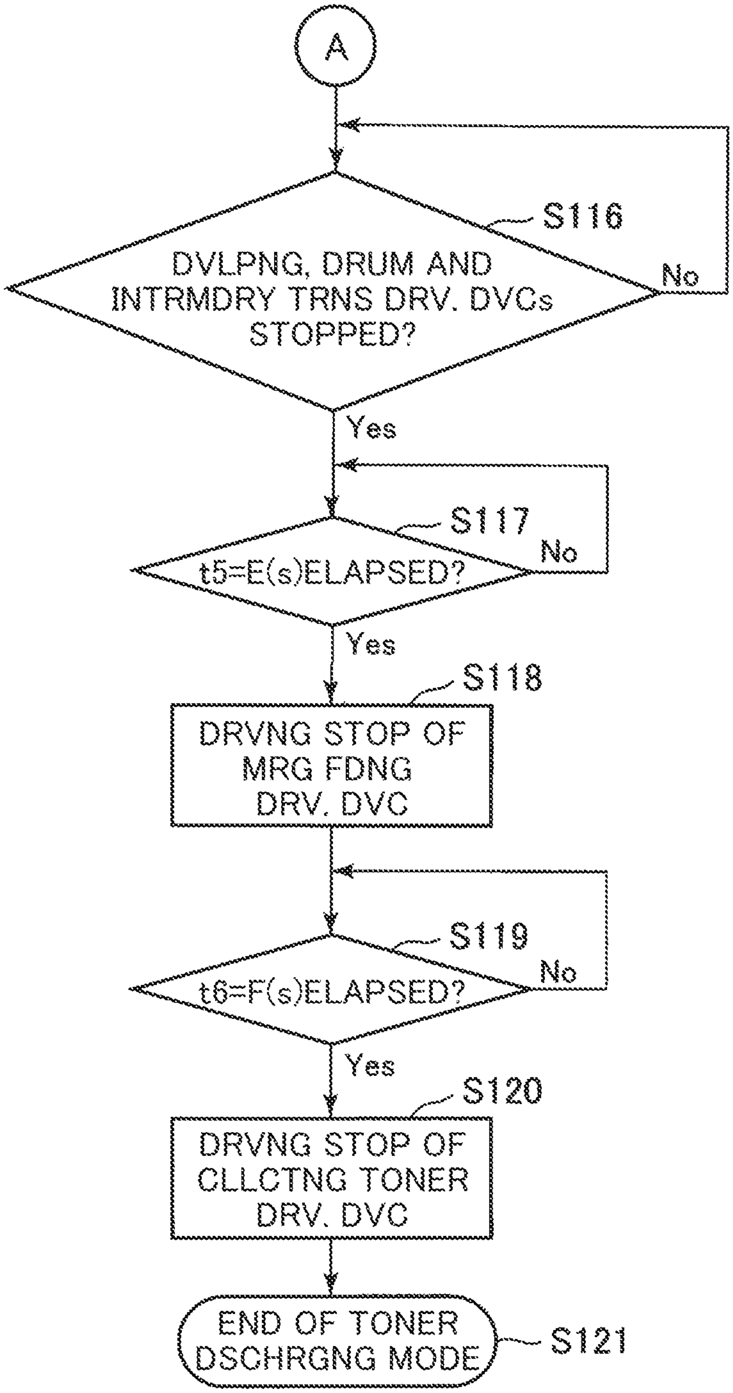
FIG. 7B is a flow chart of the toner discharge mode.
Figure 8:
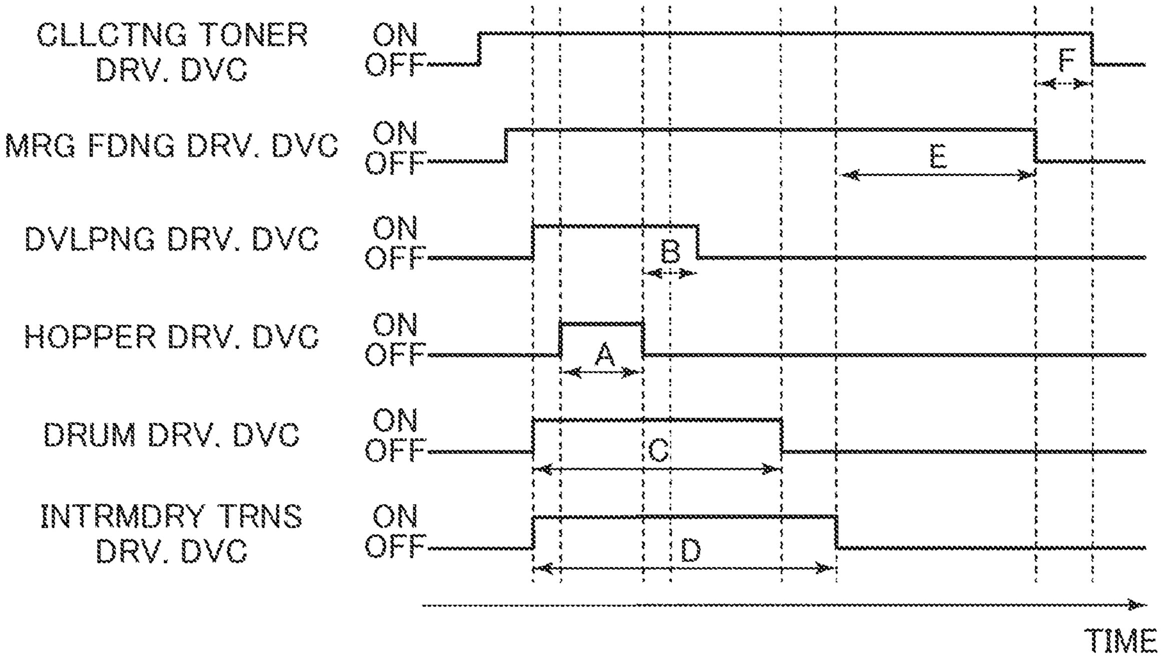
FIG. 8 is a timing chart indicating changes in control signals in the toner discharge mode.

FIGS. 7A and 7B are flow charts indicating an outline of the toner discharge mode in the present embodiment. Further, FIG. 8 is a timing chart indicating changes in control signals for the aforementioned driving devices in the toner discharge mode of the present embodiment.

When the trigger signal for the toner discharge mode is inputted, the CPU 100 starts the toner discharge mode (S101). When the CPU 100 starts the toner discharge mode, the CPU 100 starts the driving of the toner feeding mechanisms one by one from the toner feeding mechanisms on the downstream side of the toner feeding paths (toner path system) which are connected in series. Specifically, the CPU 100 first starts the driving of the collected toner leveling mechanism 241 by the collected toner driving device 106 (S102). Next, the CPU 100 starts the driving of the merging feeding driving device 105 by the merging feeding mechanism 501 (S103). Next, the CPU 100 starts the driving of the developing feeding mechanism 141 by the developing driving device 108, the driving of the drum cleaning feeding mechanism 151 by the drum driving device 103, and the driving of the belt cleaning feeding mechanism 181 by the intermediary transfer driving device 104 substantially simultaneously (S104, S105, S106). Next, the CPU 100 starts the driving of the hopper feeding mechanism 261 by the hopper driving device 107 (S107). Incidentally, as mentioned above, if this order is not reversed, the driving of these feeding mechanisms can be started substantially simultaneously. Further, in the present embodiment, the driving of the developing feeding mechanism 141, the drum cleaning feeding mechanism 151, and the belt cleaning feeding mechanism 181 can be started substantially simultaneously; however, the order of the driving of these feeding mechanisms can be arbitrary.

The CPU 100 stops the driving of the hopper feeding mechanism 261 by the hopper driving device 107 after a time A (seconds) has elapsed since the start of the operation of the hopper feeding mechanism 261 (S108, S109). Here, the time A (seconds)=a feeding distance of the hopper feeding mechanism (mm)/{a maximum feeding capacity of the hopper feeding mechanism (mm/s)×a toner feeding efficiency β}. The feeding distance (the length of the toner feeding direction within a toner feedable area) and the maximum feeding capacity (an amount of toner displaced per unit time in the toner feeding direction) are determined by a configuration of the toner feeding mechanisms (the feeding distance, a screw pitch, a number of rotations, etc.). The toner feeding efficiency β is a feeding efficiency which changes according to a physical property of the toner (powder), and can typically be configured within a range of 1~⅕.

The CPU 100 stops the driving of the developing feeding mechanism 141 by the developing driving device 108 after a time B (seconds) has elapsed since the hopper feeding mechanism 261 by the hopper driving device 107 has been stopped to be driven (S110, S111). Here, the time B (seconds)=a length of the connecting portion between the hopper and the developing device (mm)/{a maximum feeding capacity of the developing feeding mechanism (mm/s)×the toner feeding efficiency β}. The toner and carrier are accommodated inside of the developing devices 14 in a way that they circulate. For this reason, the developing feeding mechanism 141 only needs to be driven for a duration for the toner (the replenishment developer) discharged from the hopper 26 to finish entering the receiving port 14*e* (the opening portion) on the developing devices 14, and to be sufficiently accommodated inside of the developing devices 14. At this time, the amount of the carrier and toner (the replenishment developer) matching the amount of the toner accommodated inside of the developing devices 14 will be discharged from the developing devices 14 again. In the present embodiment, the length of the connecting portion between the hopper 26 and the developing devices 14 is represented by the length of the toner feeding direction in the toner feeding area of the developing devices 14, in which the aforementioned receiving port 14*e* is projected in a direction of gravity. However, in a case in which there is a sufficient margin of the toner that can be accommodated in this connecting portion, etc., the stopping of the driving of the hopper feeding mechanism 261 (the stopping of the toner falling from the hopper 26 into the developing devices 14) and the stopping of the driving of the developing feeding mechanism 141 can be configured to be substantially simultaneous.

The CPU 100 stops the driving of the drum cleaning feeding mechanism 151 by the drum driving device 103 after a time C (seconds) has elapsed since the start of the operation of the drum cleaning feeding mechanism 151 (S112, S113). Here, the time C (seconds)=a length of a feeding distance of the drum cleaning feeding mechanism (mm)/{a maximum feeding capacity of the drum cleaning feeding mechanism (mm/s)×the toner feeding efficiency β}.

The CPU 100 stops the driving of the belt cleaning feeding mechanism 181 by the intermediary transfer driving device 104 after a time D (seconds) has elapsed since the start of the operation of the belt cleaning feeding mechanism 181 (S114, S115). Here, the time D (seconds)=a feeding distance of the belt cleaning feeding mechanism (mm)/{a maximum feeding capacity of the belt cleaning feeding mechanism (mm/s)×the toner feeding efficiency β}.

The CPU 100 stops the driving of the merging feeding driving device 105 by the merging feeding mechanism 501 after a time E (seconds) has elapsed after all of the following have been stopped to be driven: the developing driving device 108, the drum driving device 103, the developing feeding mechanism 141 by the intermediary transfer driving device 104, the drum cleaning feeding mechanism 151, and the belt cleaning feeding mechanism 181 (S116, S117, S118).

Here, the time E (seconds)=a longest feeding distance L of the merging feeding mechanism 501 (mm)/{a maximum feeding capacity of the merging feeding mechanism 501 (mm/s)×the toner feeding efficiency β}. Because the merging feeding portion 50 may include a plurality of paths L1, L2 (FIG. 2), as in the present embodiment, the time E is calculated based on a longest feeding distance L=MAX (L1, L2), which is the longest feeding distance of a plurality of paths. Incidentally, regarding other toner feeding portions, not limited to the merging feeding portion 50, in a case in which there are a plurality of paths, the driving time of the toner feeding mechanisms can be calculated based on the longest feeding distance. Incidentally, as mentioned above, in the present embodiment, in a case in which the developing driving device 108, the drum driving device 103, the developing feeding mechanism 141 by the intermediary transfer driving device 104, the drum cleaning feeding mechanism 151, and the belt cleaning feeding mechanism 181 are to be stopped to be driven at an end of an image forming job, the driving time is configured to be a minimum amount of time. That is, the driving of these processes is stopped one by one to match a timing of a trailing end of the image area of the last job passing through each process position. For example, the drum cleaning feeding mechanism 151 stops driving after a first predetermined time has elapsed since the trailing end of the image area of the last job has passed through a cleaning position. Further, in the toner discharge mode in the present embodiment, in a case in which the driving time of the drum cleaning feeding mechanism 151 is configured to be a second predetermined time, the second predetermined time is configured to be longer than the first predetermined time.

Further, the developing feeding mechanism 141 by other developing driving devices and the intermediary transfer driving device 104 is the same as the drum cleaning feeding mechanism 151. That is, the time from when the trailing end of the image area of the last job passes through at the end of the image forming job to when the driving is stopped is configured to be shorter than the driving time for each driving device in the toner discharge mode.

Further, in the present embodiment, a time from when the developing driving device 108, the drum driving device 103, the developing feeding mechanism 141 by the intermediary transfer driving device 104, the drum cleaning feeding mechanism 151, and the belt cleaning feeding mechanism 181 are all stopped to be driven at the end of the image forming job to when the merging feeding mechanism 501 is stopped to be driven is also a minimum amount of driving time required, and is therefore configured to be shorter than the aforementioned time E (sec). Therefore, when a time from stopping the driving of the photosensitive drum 11 to stopping the driving of the merging feeding portion 50 is configured to be a first main assembly driving time at the end of the image forming job, and a time from stopping the driving of the photosensitive drum 11 to stopping the driving of the merging feeding portion is configured to be a second main assembly driving time during discharging operation, the second main assembly driving time is longer than the first main assembly driving time.

The CPU 100 stops the driving of the collected toner leveling mechanism 241 by the collected toner driving device 106 after a time F (seconds) has elapsed since the merging feeding mechanism 501 is stopped to be driven by the merging feeding driving device 105 (S119, S120). Here, the time F (seconds)=a length of the connecting portion between the merging feeding portion and the collected toner box (mm)/{a maximum feeding capacity of the collected toner leveling mechanism (mm/s)×the toner feeding efficiency β}. The toner discharged from the merging feeding portion 50 is accommodated inside of the collected toner box 24. For this reason, the collected toner leveling mechanism 241 only needs to be driven for a duration for the toner discharged from the merging feeding portion 50 to finish entering the receiving port 24*e* (the opening portion) on the collected toner box 24 and to be sufficiently accommodated inside of the collected toner box 24. In the present embodiment, the length of the connecting portion between the merging feeding portion 50 and the collected toner box 24 is represented by the length of the toner feeding direction in the toner feeding area inside of the collected toner box 24, in which the aforementioned receiving port 24*e* is projected in a gravity direction. However, in a case in which there is a sufficient margin of the toner that can be accommodated in this connecting portion, etc., the stopping of the driving of the merging feeding mechanism 501 (the stopping of the toner falling from the merging feeding portion 50 to the collected toner box 24) and the stopping of the driving of the collected toner leveling mechanism 241 can be configured to be substantially simultaneous.

Then, when the above operations are complete, the CPU 100 completes the toner discharge mode (S121). Incidentally, the configuration can be such that, when the CPU 100 completes the toner discharge mode, it displays data on the operating portion 40 reporting the completion of the toner discharge mode. Similar reporting of data can be done by generating sound in a speaker or generating light from a light source (lighting or flashing a light), or on an external device.

As mentioned above, during normal operation of the image forming apparatus 1, when the toner is detected inside of the detecting accommodating portion 242 by the detecting mechanism 243, the operator is notified that the collected toner box 24 is full after a fixed quantity of image formation. The performance of image forming operations is then prohibited until the collected toner box 24 has been replaced and the signal indicating the detection of the toner by the detecting mechanism 243 is turned OFF. However, in the present embodiment, even if the notification of the collected toner box 24 being full is made before the start of the toner discharge mode or during the performance of the toner discharge mode, the toner discharge mode is configured to not be stopped. In other words, during the performance of the toner discharge mode, even if a signal indicating that the toner has been detected by the detecting mechanism 243 is inputted, the operation of the aforementioned toner discharge mode will be continued (that is to say, is not interrupted). In general, the position of the powder inside of the collected toner box 24, which notifies that the collected toner box 24 is full, is provided with a predetermined margin so that the collected toner (toner and carrier) with a largely varying bulk density is not leaked. For this reason, if this margin is also considered for a discharge amount estimated in the toner discharge mode, the toner will not be leaked from the collected toner box even if the toner discharge mode is continued after full is notified. Further, even if the toner discharge mode is performed repeatedly, it will also not be leaked because the toner feeding portion is already in a cleaned state.

In this way, in the present embodiment, the image forming apparatus 1, which forms an image on the recording material S, comprises the image forming portion (printer engine) 28, which performs an image forming operation that forms an image on the recording material S by using the developer based on image data, the collecting container (the collected toner box) 24, which accommodates the developer that is discharged and collected from the image forming portion 28, and a collecting feeding mechanism (the merging feeding mechanism) 501, which is a feeding mechanism that feeds the developer, and includes the collecting feeding portion (the merging feeding portion) 50, which is configured on the main assembly 2 of the image forming apparatus 1, and which receives the developer discharged from the image forming portion 28 and feeds it toward the collecting container 24, and a control portion 100, which is controllable of the collecting feeding mechanism 501. The control portion 100 is controllable to perform the discharge mode which discharges the developer from the collecting feeding member 50 to the collecting container 24 by driving the collecting feeding mechanism 501 without an accompanying image forming operation. In the present embodiment, the image forming apparatus 1 is provided with the discharging feeding mechanisms (the developing feeding mechanism, the drum cleaning feeding mechanism, the belt cleaning feeding mechanism) 141, 151 and 181, which are the feeding mechanisms that feed the developer, and includes feeding portions 14, 15 and 18, which feed the toner that has been discharged and collected from the image forming portion 28 toward the collecting feeding portion 50. In the discharge mode, the control portion 100 controls the discharging feeding mechanisms 141, 151 and 181 so that they are drivable.

In the present embodiment, the image forming portion 28 is provided with an image bearing member 11, which bears an image that is transferred to the recording material S, and the cleaning devices 15, which collect the developer from the image bearing member 11 and clean the image bearing member 11. The cleaning devices 15 comprise the aforementioned feeding portion. In the present embodiment, the discharging feeding mechanisms 151 of the cleaning devices 15 and the image bearing member 11 are driven in interrelation. In the present embodiment, the cleaning devices 15 are detachable from the main assembly 2. Further, in the present embodiment, the image forming portion 28 is provided with the image bearing member 11, which bears the image that has been transferred to the recording material S, an intermediary transfer member 16, which feeds the image transferred from the image bearing member 11 so that it is transferred the recording material S, and an intermediary transfer member cleaning device 18, which collects the developer from the intermediary transfer belt 16 and cleans the intermediary transfer member 16. The intermediary transfer member cleaning device 18 comprises the aforementioned feeding portion. In the present embodiment, the discharging feeding mechanism 181 of the intermediary transfer member cleaning device 18 and the intermediary transfer member 16 are driven in interrelation. In the present embodiment, the intermediary transfer member cleaning device 18 is detachable from the main assembly 2. Further, in the present embodiment, the image forming portion 28 includes the image bearing member 11, which bears the image to be transferred to the recording material S, and the developing devices 14, which form an image on the image bearing member 11 by using the developer provided with the toner and carrier. The developing devices 14 comprise the aforementioned feeding portion. In the present embodiment, the developing devices 14 are detachable from the main assembly 2.

Further, in the present embodiment, the image forming apparatus 1 is provided with a supplying feeding mechanism (the hopper feeding mechanism) 261, which is a feeding mechanism that feeds the developer, and includes the hopper 26, which is provided on the main assembly 2 and which supplies the developer replenished from replenishing containers (toner bottles) 25, which are detachable from the main assembly 2, to the developing devices 14. In the discharge mode, the control portion 100 controls the supplying feeding mechanism 261 so that it is drivable. In the present embodiment, the control portion 100 controls so that the developer is not replenished from the replenishing containers 25 to the hopper 26 in the discharge mode. Further, in the present embodiment, the image forming apparatus 1 includes a collecting container feeding mechanism (the collected toner leveling mechanism) 241, which is a feeding mechanism that feeds the developer inside of the collecting container 24. In the discharge mode, the control portion 100 controls the collecting container feeding mechanism 241 so that it is drivable.

Further, in the present embodiment, the control portion 100 controls so that, when completing the discharge mode, of the aforementioned plurality of the developer feeding mechanisms connected in series in the developer feeding paths toward the collecting container 24, the driving of the first feeding mechanism is stopped before the driving of the second feeding mechanism, which is provided further downstream than the first feeding mechanism. Further, in the present embodiment, the control portion 100 controls so that, when starting the discharge mode, of the aforementioned plurality of feeding mechanisms in the developer feeding paths connected in series toward the collecting container 24, the driving of the second feeding mechanism, which is provided further downstream than the first feeding mechanism, is started before the driving of the first feeding mechanism. Further, in the present embodiment, the image forming apparatus 1 includes the detecting portion (the detecting mechanism) 243, which detects the developer inside of the collecting container 24. It is possible for the control portion 100 to prevent the performance of the image forming operation if the developer is detected inside of the detecting portion 243. At the same time, the control portion 100 does not prevent the performance of the discharge mode even if the detecting portion 243 detects the developer inside of the collecting container during the performance of the discharge mode.

Further, in the present embodiment, the image forming apparatus 1 includes the operating portion 40, into which instructions can be inputted to the control portion 100 by an operation by the operator. The control portion 100 can perform the discharge mode in response to instructions inputted from the operating portion 40. Further, in the present embodiment, the image forming apparatus 1 includes the communication device 41, which enables communication between the control portion 100 and a device external to the image forming apparatus 1. The control portion 100 can perform the discharge mode in response to instructions inputted from the aforementioned external device via the communication device 41. Further, in the present embodiment, the collecting container 24 is detachable from the main assembly 2.

As described above, in the present embodiment, the image forming apparatus 1 is capable of performing the toner discharge mode, which operates the toner feeding mechanism of the merging feeding portion 50 provided on the side of the main assembly 2 at an arbitrary timing without an accompanying image forming operation. Typically, the toner discharge mode is only performed prior to the collection (waste distribution) of a used product of the image forming apparatus 1. Further, in the present embodiment, in the toner discharge mode, the toner feeding mechanism of the hopper 26, which is provided on the side of the main assembly 2, is also operated. Further, in the present embodiment, in the toner discharge mode, the toner feeding mechanisms of the developing devices 14, which are detachable from the main assembly 2, the drum cleaning devices 15, the belt cleaning device 18, and the collected toner box 24 are also operated. Furthermore, in the present embodiment, from the state in which each of the aforementioned toner feeding mechanisms are operating, the toner feeding mechanisms are stopped one by one from the toner feeding mechanisms on the upstream side of the toner feeding paths connected in series, after each toner feeding mechanism has been driven for a sufficient length of time. In the present embodiment, having this configuration allows most of the toner remaining inside of the image forming apparatus 1 to be consolidated in the collected toner box 24 before the used product of the image forming apparatus 1 is collected. The toner dispersal inside of the apparatus due to vibration during transportation can also be suppressed when collecting used products of the image forming apparatus 1. Further, according to the present embodiment, the depletion of the lifetime of toner feeding portion parts caused by the cleaning operations and the depletion of the lifetime of the functional members, such as the photosensitive drums 11 and the intermediary transfer belt 16, can be minimized.

In particular, the merging feeding portion 50 is a toner feeding portion which finally collects the toner inside of the image forming apparatus 1 and discharges it toward the collected toner box 24. Further, the merging feeding portion 50 is not removable from the main assembly 2. For this reason, by sufficiently discharging the toner inside of the merging feeding portion 50 and discharging it into the collected toner box 24 using the toner discharge mode, the toner dispersal can be suppressed during the collection of used products of the image forming apparatus 1. Because the hopper 26 is also not removable from the main assembly 2, it is desirable to sufficiently discharge the toner inside of the hopper 26 by using the toner discharge mode (which also discharges the toner from the developing devices 14). In the present embodiment, the drum cleaning devices 15 (the process units P) and the belt cleaning device 18 (the intermediary transfer unit 27) are removable from the main assembly 2. Therefore, it is conceivable that these devices be removed before transporting the image forming apparatus 1. However, in general, in view of the workability for transportation, the image forming apparatus 1 is often transported without these devices being removed. For this reason, it is desirable to sufficiently discharge the toner inside of the drum cleaning devices 15 and the belt cleaning device 18 using the toner discharge mode. Even if the image forming apparatus 1 is transported after these devices are removed, considering the toner dispersal from the removed devices, it is still desirable to sufficiently discharge the toner from these devices using the toner discharge mode. Incidentally, the collected toner box 24 is also removable from the main assembly 2; however, the image forming apparatus 1 is often transported without this device being removed. In considering a case in which the image forming apparatus 1 is transported after this device is removed, it can be said that it becomes even more important to sufficiently discharge the toner from the merging feeding portion 50 using the toner discharge mode.

Therefore, according to the present embodiment, the remanufacture of the image forming apparatus 1 for reuse can be facilitated by suppressing the toner dispersal inside of the used product of the image forming apparatus 1 during the collection of the used product of image forming apparatus 1.

[Other]

While the present invention has been described with reference to the exemplary embodiment, it is to be understood that the invention is not limited to the disclosed exemplary embodiment.

In the aforementioned embodiment, the drum driving device 103, the intermediary transfer driving device 104, the merging feeding driving device 105, the collected toner driving device 106, the hopper driving device 107, and the developing driving device 108 were each provided independently. However, the present invention is not limited to such a configuration.

As described in aforementioned embodiment, it suffices to be able to stop the toner feeding mechanisms one by one from the toner feeding mechanisms on the upstream side in the toner feeding paths which are connected in series. For example, the toner feeding mechanism of the collected toner box 24 and the toner feeding mechanism of the merging feeding portion 50 can be operated by a common driving device. In this case, these toner feeding mechanisms only need to be operated for a duration=the time E (seconds)+the time F (seconds) as described in the aforementioned embodiment.

Further, although the toner discharge mode according to the present invention acts effectively especially in suppressing the toner dispersal during the collection of used image forming apparatus products, it is not limited to this. For example, in a case in which it is necessary to discharge the toner inside of a toner feeding portion, such as the merging feeding portion, for maintenance of an image forming apparatus in use, the toner discharge mode according to the present invention can be performed.

Further, in the aforementioned embodiment, a configuration in which the toner from the cleaning devices of the photosensitive drums and the intermediary transfer belt is collected in the collected toner box is described; however, the configuration can be such that the toner is collected from an additional or another element of these cleaning devices. For example, a configuration in which the toner from the cleaning device of the secondary transfer roller is collected in the collected toner box by a merging feeding portion similar to that in the aforementioned embodiment can be illustrated.

According to the present invention, the toner dispersal inside of the used image forming apparatus products can be suppressed when collecting the used products.

While the present invention has been described with reference to the exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2022-102274 filed on Jun. 24, 2022, which is hereby incorporated by reference herein in its entirety.

What is claimed is:

1. An image forming apparatus comprising:

an image bearing member;

a cleaning device detachably provided on a main assembly and configured to clean toner remaining on the image bearing member;

a main assembly feeding portion provided on the main assembly and configured to feed the toner discharged from the cleaning device;

a collecting container detachably provided on the main assembly and configured to collect the toner discharged from the main assembly feeding portion;

a control portion configured to control the main assembly feeding portion; and an operating portion capable of manually inputting a predetermined instruction to the control portion, wherein the control portion performs a discharging operation without involving an image forming operation based on the predetermined instruction input through the operating portion, the discharge operation being an operation in which the main assembly feeding portion is caused to be driven to discharge the toner.

2. An image forming apparatus according to claim 1, wherein, in a case in which a drive of the image bearing member and a drive of the main assembly feeding portion are stopped upon a completion of an image forming job, when a time from stopping the drive of the image bearing member to stopping the drive of the main assembly feeding portion is defined as a first driving time, and in case in which the discharge operation is executed, when a driving time of the main assembly feeding portion during the discharging operation is defined as a second driving time, the second driving time is longer than the first driving time.

3. An image forming apparatus according to claim 1, wherein in a case in which a drive of the image bearing member and a drive of the main assembly feeding portion are stopped upon a completion of an image forming job, when a time from when a trailing end of a last image area of the image forming job reaches the cleaning device to stopping the drive of the image bearing member is defined as a first driving time, and in a case in which the discharge operation is executed, a driving time of the main assembly feeding portion during the discharging operation is defined as a second driving time, the second driving time is longer than the first driving time.

4. An image forming apparatus according to claim 1, wherein the discharging operation includes a first discharging operation in which the toner remaining in the cleaning device is discharged and a second discharging operation in which the main assembly feeding portion is driven so that the toner discharged from the cleaning device to the main assembly feeding portion by the first discharging operation is discharged.

5. An image forming apparatus according to claim 4, wherein a driving source for driving the cleaning device and a driving source for driving the image bearing member are common.

6. An image forming apparatus according to claim 1, wherein the image bearing member is an intermediary transfer member to which a toner image formed on another image bearing member is transferred.

7. An image forming apparatus according to claim 1, further comprising a detecting portion configured to detect developer in the collecting container, wherein the control portion prevents the image forming operation from being performed in a case in which the developer is detected by the detecting portion, and is capable of performing the discharging operation even in the case in which the developer is detected by the detecting portion.

8. An image forming apparatus according to claim 1, further comprising an image forming portion configured to form a toner image on the image bearing member;

wherein the image forming apparatus is configured not to reuse the toner collected by the collecting container in the image forming portion.

* * * * *